United States Patent [19]
Dikeman

[11] Patent Number: 5,913,456
[45] Date of Patent: Jun. 22, 1999

[54] PRESSURIZED PORTABLE DRINKING SYSTEM

[76] Inventor: W. Cary Dikeman, 12619 Pawnee La., Leawood, Kans. 66209

[21] Appl. No.: 08/931,591

[22] Filed: Sep. 16, 1997

[51] Int. Cl.⁶ .................................................. B65D 35/28
[52] U.S. Cl. ........................ 222/95; 222/105; 222/175; 222/465.1; 224/148.2; 383/43; 383/68
[58] Field of Search .............................. 222/95, 105, 209, 222/401, 175, 608–610, 465.1, 466; 383/10, 43, 68, 69; 224/148.2

[56] References Cited

U.S. PATENT DOCUMENTS

| | | | |
|---|---|---|---|
| 3,251,390 | 5/1966 | Evans | 383/43 X |
| 3,272,248 | 9/1966 | O'Farrell | 383/43 |
| 3,437,117 | 4/1969 | Vitello et al. | 383/43 X |
| 4,836,416 | 6/1989 | Shalgi et al. | 222/105 X |
| 4,871,264 | 10/1989 | Robbins, III et al. | 383/68 |
| 4,911,562 | 3/1990 | Mazzeschi | 383/10 X |
| 5,037,138 | 8/1991 | McClintock et al. | 383/43 X |
| 5,059,182 | 10/1991 | Laing | 222/95 X |
| 5,060,833 | 10/1991 | Edison et al. | 222/175 X |
| 5,085,349 | 2/1992 | Fawcett | 222/175 |
| 5,282,322 | 2/1994 | Kasuya | 383/68 X |
| 5,497,912 | 3/1996 | Hoback et al. | 222/95 |

Primary Examiner—Kevin P. Shaver
Attorney, Agent, or Firm—Shook, Hardy & Bacon L.L.P.

[57] ABSTRACT

A liquid dispenser 16 includes a container 20 formed of flexible synthetic resin material, and a hose 22 connected to the container for dispensing liquid. A valve assembly 46 is positioned in the hose 22, and is shiftable between a flow-blocking position in which flow of the liquid is blocked and a flow-permitting position in which the liquid is dispensed. The container 20 includes an interior liquid-receiving cavity 32, a handle 40, 41 by which the container can be supported while the cavity is filled with liquid, and a mouth 36 located above the cavity adjacent the upper end of the container. The mouth 36 is movable between an open position presenting a fill opening in fluid communication with the cavity 32, and a closed position. The dispenser 16 also includes a closure assembly 21 that is positionable in a sealed position sealing the cavity shut beneath the mouth so that the cavity is substantially liquid tight, and an unsealed position exposing the cavity to the mouth for filling.

18 Claims, 2 Drawing Sheets

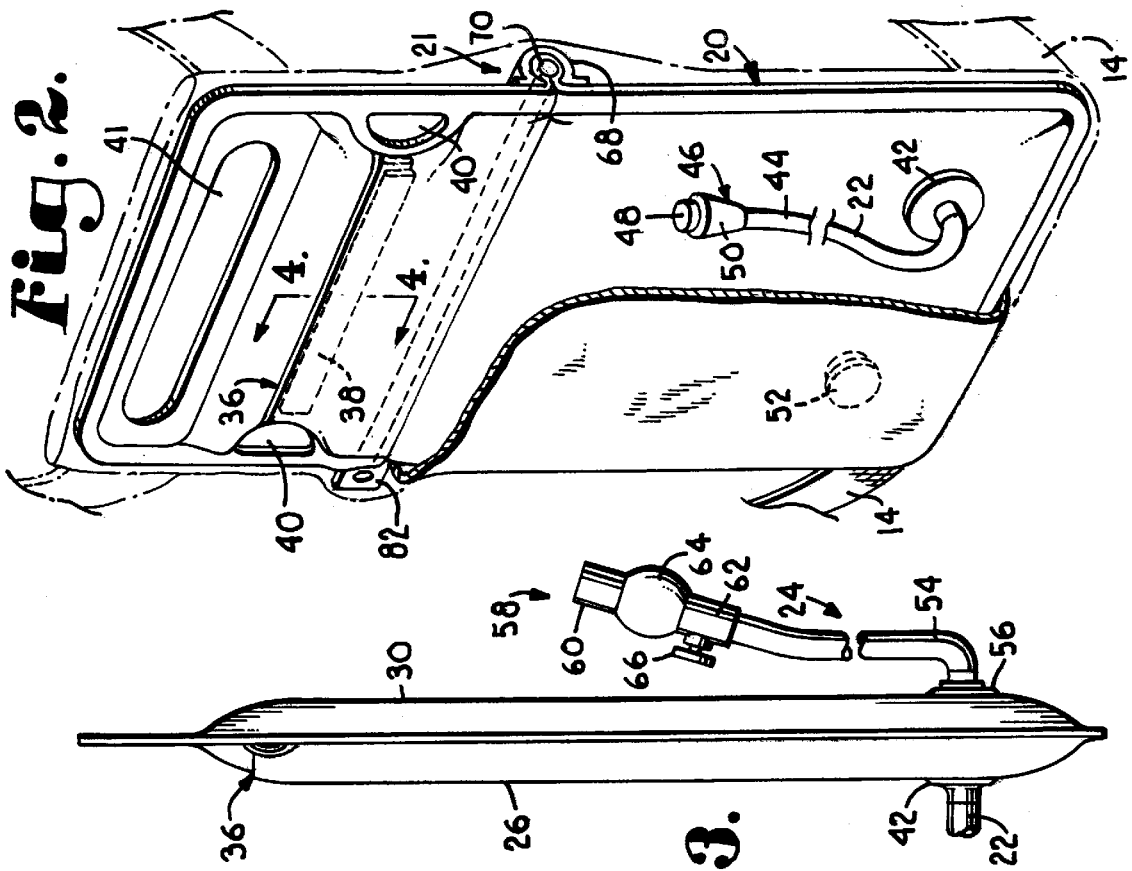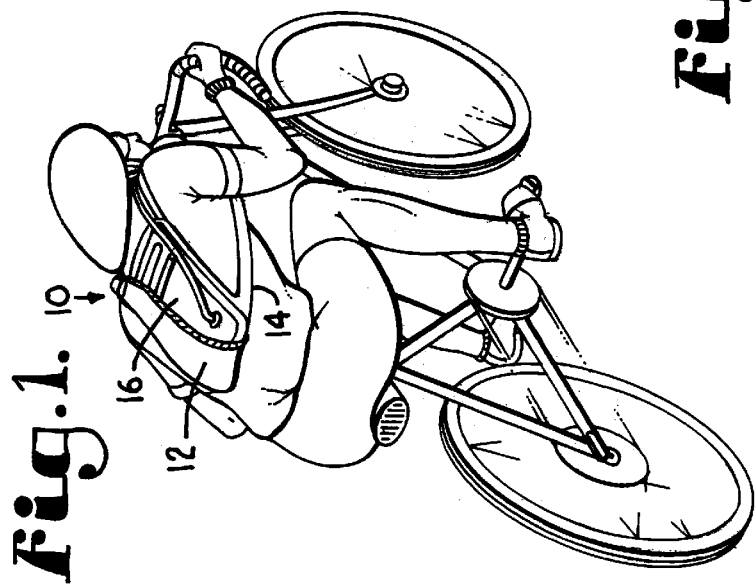

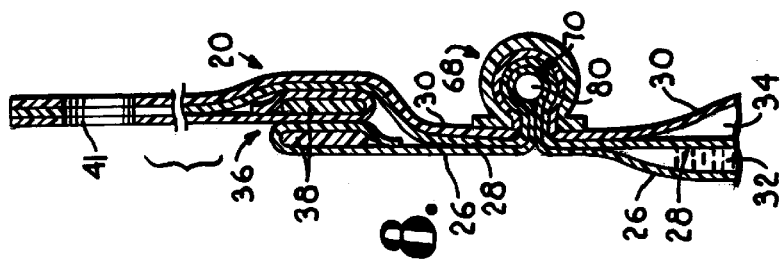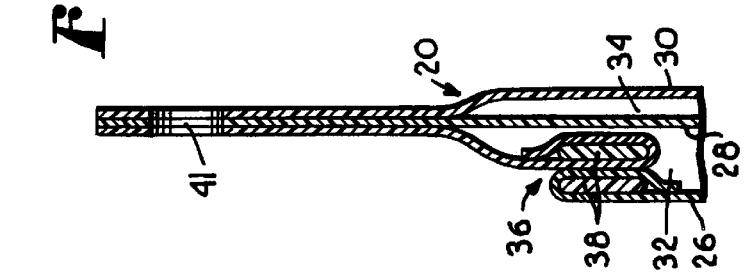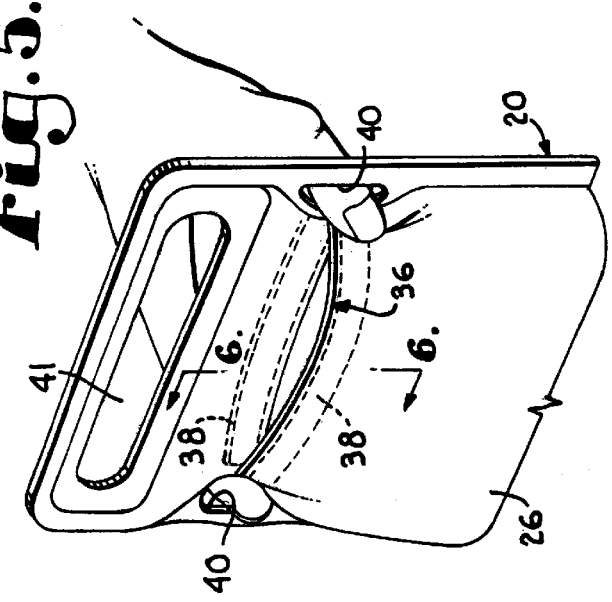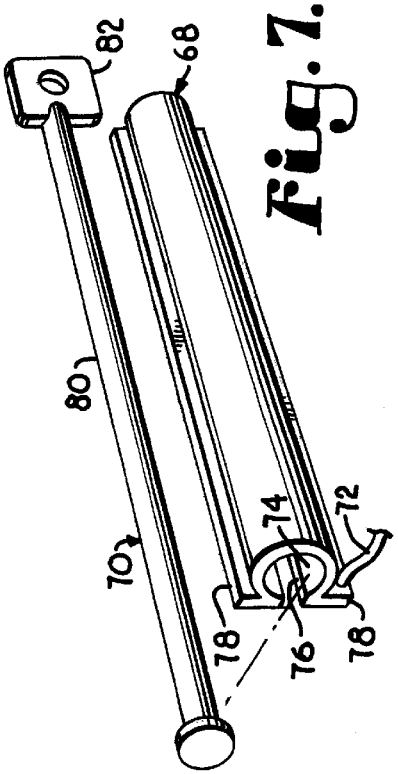

PRESSURIZED PORTABLE DRINKING SYSTEM

BACKGROUND OF THE INVENTION

The present invention relates generally to liquid dispensers, and more particularly to a liquid dispenser having an easy to fill flexible container and a liquid-tight closure assembly.

Hydration is a major concern for bicyclists, runners and hikers during prolonged workouts. Conventionally, such athletes either stop at water stations periodically during their training, or carry water bottles with them in order to ensure sufficient water intake to prevent dehydration during and immediately after completing their activities. Unfortunately, water stations are usually not available, except in organized events, and water bottles hold only a limited amount of water insufficient for activities of extended duration.

More recently, a hydration system has been developed that includes a water supply that is supported on the athlete in a backpack. This known system generally includes the backpack and a replaceable water sack or bag that is sized for receipt in the backpack. The backpack includes shoulder straps that permit the pack to be supported on the back of the athlete. The water bag, which is formed of polyurethane or the like, is fitted with an elongated hose having a first end connected to the bag and a distal free end that the athlete can place in his or her mouth. A valve is provided in the distal end of the hose for controlling the flow of water, and the athlete actuates the valve by depressing it with his or her tongue, releasing water for consumption. A fill opening is provided in the bag for permitting filling of the bag with water, as is a cap for closing off the fill opening. Typically, the fill opening and cap are molded as a single piece of synthetic resin material that is fastened to the material of the bag by ultrasonic welding or the like.

During use of the conventional hydration system, the user supports the dispenser, e.g. by gripping the cap and tether, and fills the bag with water or other suitable liquid. Thereafter, the cap is closed over the fill opening and the dispenser is placed in the back pack or other suitable support so that the user can easily carry the dispenser during hiking, biking or the like. The hose is carried in or close to the user's mouth so that water can be consumed on demand with little extraneous effort, and water is supplied to the athlete under the force of gravity by the pressure head existing in the system.

A common problem that arises in the use of conventional dispensers is that the fill opening tears free from the bag material when a user attempts to fill the bag while gripping only the cap and tether of the opening. Because conventional dispensers are not designed to withstand such loads at the welded connection between the bag and the fill opening, the container material frequently tears under the weight of the liquid, ruining the dispenser.

SUMMARY OF THE INVENTION

It is an object of the present invention to provide a liquid dispenser having a flexible, large-mouth container that is easy to support during filling, and a closure assembly for sealing the container shut once filling is complete to permit ready dispensing of the liquid through a hose connected to the container.

In accordance with this and other objects evident from the following description of a preferred embodiment of the invention, a liquid dispenser is provided which includes a container formed of flexible synthetic resin material. The container presents upper and lower ends, an interior liquid-receiving cavity, a handle by which the container can be supported while the cavity is filled with liquid, and a mouth located above the cavity adjacent the upper end of the container. The mouth is movable between an open position presenting a fill opening in fluid communication with the cavity, and a closed position. A closure assembly is positionable in a sealed position sealing the cavity shut beneath the mouth so that the cavity is substantially liquid tight, and an unsealed position exposing the cavity to the mouth for filling.

An outlet port is formed in the container in fluid communication with the cavity for dispensing liquid from the cavity, and a flexible hose is connected to the outlet port. The hose includes a remote outlet end in which a valve is positioned. The valve is shiftable between a flow-blocking position in which flow of the liquid is blocked and a flow-permitting position in which the liquid is dispensed.

By providing a dispenser in accordance with the present invention, numerous advantages are realized. For example, by providing the container with a mouth that is movable to an open position defining a fill opening, a larger opening can be provided than exists in conventional dispensers. This larger opening permits the container to be filled quickly while being supported by the handle. Thus, the container is easy to fill, and provides a ready means for supporting the weight of the liquid therein.

Another advantage of the inventive construction resides in the provision of a closure assembly for closing off the cavity of the container from the mouth once the cavity is filled. The closure assembly preferably includes a channel element and a rod element between which the container is pinched in the sealed position of the closure assembly. The channel element presents an elongated channel having a first width and a coextensive opening having a width smaller than the first width. The rod element presents an elongated body having a width larger than about the width of the opening so that the closure assembly is placed in the sealed position by positioning the container between the channel element and the rod element and forcing the body of the rod element and the material of the container past the opening into the channel along the length of the channel. As such, a liquid-tight seal is provided between the cavity and mouth of the container, permitting the container to be oriented in any desired direction without leaking through the mouth.

In accordance with a preferred embodiment of the invention, the container includes structure defining first and second side-by-side cavities, wherein the first cavity is in fluid communication with the fill opening and the second cavity is isolated from the fill opening. A pump means is provided in fluid communication with the second cavity for pressurizing the second cavity, and a support means supports the container and exerts an inward pressure on the container in opposition to the outward pressure in the cavities so that the pressure in the second cavity is exerted on the liquid in the first cavity to dispense the liquid under pressure. By providing this construction, the dispenser supplies the liquid under pressure regardless of the orientation of the dispenser or the athlete using it.

BRIEF DESCRIPTION OF THE DRAWING

The preferred embodiment of the present invention is described in detail below with reference to the attached drawing figures, wherein like reference numerals are used to indicate like parts in the various figures, and:

FIG. 1 is a perspective view of a cyclist outfitted with a water dispensing system constructed in accordance with the preferred embodiment;

FIG. 2 is a rear elevational view of the water dispensing system, illustrating a liquid dispenser forming a part of the system;

FIG. 3 is a side elevational view of the dispenser in a closed and sealed condition;

FIG. 4 is a sectional view of the dispenser taken along line 4—4 in FIG. 2;

FIG. 5 is a fragmentary perspective view of the dispenser in an open position;

FIG. 6 is a sectional view taken along line 6—6 of FIG. 5;

FIG. 7 is a perspective view of channel and rod elements forming as part of the dispenser; and FIG. 8 is a sectional view similar to FIG. 4, illustrating the dispenser in a closed, sealed condition.

DETAILED DESCRIPTION OF THE PREFERRED EMBODIMENT

A bicyclist outfitted with a hydration system is illustrated in FIG. 1, wherein the hydration system includes a dispenser constructed in accordance with the preferred embodiment of the present invention. The hydration system 10 is shown in FIG. 1, and broadly includes any suitable support such as a backpack 12 having straps 14 by which the pack is supported on the cyclist, and the dispenser 16.

As shown in FIG. 2, the backpack 12 includes front and back panels that define an enclosure within which the dispenser 16 is received, and a closure is provided at the top of the pack for securing the dispenser therein. The straps 14 of the pack are each connected between the upper and lower comers thereof and are sized for receipt over the arms and shoulders of the athlete. An O-ring or any other known fastening expedient is provided on each strap for supporting elements of the dispenser within easy reach of the athlete, as described below.

The dispenser 16 is illustrated in FIG. 3, and includes a container 20, a closure assembly 21 for sealing the container shut upon filling, a hose 22 for dispensing liquid, and a pump mechanism 24. As shown in FIG. 4, the container 20 is formed out of a flexible synthetic resin material such as vinyl, polyurethane or the like, and is preferably manufactured by placing three elongated, co-extensive panels 26, 28, 30 of synthetic resin material together and sealing them to one another along the circumferential edges thereof, e.g. by ultrasonic welding or through the use of an adhesive. In this manner, the container includes an interior that is divided by the intermediate panel 28 into two side-by-side bags or cavities 32, 34 that are isolated from one another, each being fluid-tight to prevent leakage both from between the cavities and from the container.

A mouth 36 is formed in the container in fluid communication with the first cavity 32 and permits the cavity to be filled with a liquid such as water or the like that is to be dispensed. Preferably, the panel 26 includes a slit extending in a direction transverse to the length of the container adjacent the upper end of the panel. As such, the upper section of the panel above the slit presents a lower edge defining one lip of the mouth, and the lower panel section beneath the slit presents an upper edge defining the other lip.

The lips of the mouth 36 are movable toward and away from one another between a closed position, as shown in FIG. 4, and an open position, as shown in FIG. 6, such that when the side edges of the container are pushed inward toward one another, the lips part, exposing the first cavity for filling. In order to close the mouth, the side edges of the container are drawn away from one another, pulling the lips together. A strip 38 of support material is secured along each lip of the mouth to bias the mouth toward the closed position. Each strip 38 is formed of a flexible material that is stiff relative to the material used to form the container, and presents opposed axial ends that are generally longitudinally aligned with the axial ends of the opposing strip at or near the side edges of the container. The strips 38 give the lips of the mouth definition when the container edges are squeezed toward one another to open the mouth, and urge the mouth closed when the side edges of the container are released.

In order to facilitate manipulation of the mouth, and to permit user support of the container during filling of the first cavity with liquid, finger and thumb holes 40 are formed in the container, as shown in FIG. 5. The finger and thumb holes are substantially identical to one another, and are formed along the side edges of the container at a height generally aligned with the mouth. Preferably, the holes 40 are pre-formed in the container, and welds are formed around the circumference of each hole during manufacture to provide some stiffening of the hole edge. As such, the holes are readily accessible to a user, and provide a reliable means for supporting the weight of the container, even when it is full of liquid. Likewise, the holes 40 present a convenient means of moving the mouth 36 between the open and closed positions.

Another handle 41 is preferably formed in the container adjacent the upper end thereof, and includes a single opening extending across substantially the entire width of the container. As with the finger and thumb holes 40, the handle 41 is formed in the container and a weld is formed around the circumference of the opening to provide stiffening thereof so that the weight of the container can be supported by the handle. By providing the handle 41, an alternate support means is provided for supporting the weight of the container.

The closure assembly 21 is shown in FIG. 7, and includes a channel element 68 and a rod element 70, both of which are preferably retained on the dispenser by a tether 72 extending between the element and the container. The channel element 68 and rod element 70 together define a means for sealing the container shut beneath the mouth upon filling of the first cavity with liquid so that the container is substantially liquid tight.

The channel element 68 is formed of a synthetic resin material such as polystyrene, polypropylene or polyethylene, and presents an elongated, cylindrical channel 74 having a first diameter or width and a coextensive opening 76. The opening defines a width that is smaller than the width or diameter of the channel. A pair of flanges 78 extend along the length of the channel on either side of the opening within a plane generally tangent to the channel. The flanges add rigidity to the channel element, retaining the shape and dimensions of the opening.

The rod element 70 is formed of natural or synthetic rubber, or any other suitable material that provides the desired sealing with the channel element, and presents an elongated, cylindrical body 80 and a gripping portion 82 by which the rod element can be manipulated. The cylindrical body 80 defines a width or diameter that is larger than about the width of the opening 76 of the channel element and slightly smaller than about the width or diameter of the channel. As such, as illustrated in FIG. 8, the closure assembly is placed in the sealed position by positioning the container between the channel element 68 and the rod element 70 and forcing the body 80 of the rod element and the material of the container past the opening 76 into the channel 74 along the length of the channel.

As shown in FIG. 2, the hose 22 is formed of a flexible synthetic resin material, and includes a first end that is held in fluid communication with the first cavity by a fitting 42, and a distal free end 44. A valve assembly 46 is fitted on the distal end of the hose and includes a valve 48 that is shiftable between a flow-preventing position in which flow of the liquid is blocked and a flow-permitting position in which the liquid is dispensed. Preferably, the valve 48 normally seats against an outer housing 50 forming a part of the valve assembly 46, and a compression spring is disposed within the housing and biases the valve toward the seated position to prevent liquid flow. The valve is opened by depressing it into the housing against the bias of the spring, opening a flow path along which the liquid is supplied.

A relief valve 52 is provided on the container in communication with the first cavity for permitting air to be exhausted from the cavity under pressure. The valve is of a conventional construction which permits air to be exhausted from the cavity without allowing leakage of the liquid.

Returning to FIG. 3, the pump mechanism 24 includes a hose 54 having a first end in fluid communication with the second cavity of the bag through a fitting 56 and a distal second end. A pump 58 is fitted on the second end of the hose and is operable for drawing air into the hose and forcing the air under pressure into the second cavity 34, pressurizing the second cavity. Such pressure is exerted on the liquid in the first cavity by the flexible intermediate panel 28 so that the liquid in the first cavity is dispensed under pressure.

The pump 58 preferably includes a pair of one-way flow valves 60 and a compressible, hollow bladder 64 positioned in line with and between the valves 60. The valves are both oriented to permit flow into the hose, and the bladder is formed of a material such as rubber, wherein the bladder assumes an uncompressed shape upon release of the bladder after compression. In operation, air from within the bladder is forced under pressure through the one-way valve 62 into the hose 54 and the second cavity 34 of the container. Thereafter, when the bladder is released, it assumes the uncompressed shape, drawing air into the bladder through the one-way valve 60. Thus, repeated compression and release of the bladder pressurizes the second cavity of the container. If desired, a relief valve 66 can be provided for relieving pressure from the second cavity of the container so that the athlete can selectively increase or decrease the pressure under which liquid is dispensed.

In operation, with the closure assembly 21 removed from sealing engagement with the container, the mouth 36 is opened by squeezing the side edges of the container together at the thumb and finger holes 40, as shown in FIG. 5, and water or any other suitable liquid is poured into the first cavity 32 to a desired level. Thereafter, the mouth is closed and the rod element 70 and channel element 68 of the closure assembly, as shown in FIG. 8, are positioned on either side of the container at a position immediately beneath the mouth. The rod element 70 is thereafter forced past the opening 76 of the channel assembly into the channel 74, forcing the material of the container to also be pressed into the channel. The construction of the rod element 70 permits this action to be accomplished by pushing one axial end of the body 80 into the channel, and then successively forcing more and more of the length of the body into the channel in a fashion similar to that of a ZIP-LOCK® brand bag closure. The size of the body is such that the rod and container material are trapped within the channel, sealing the first cavity shut along the length of the channel.

Once the container is sealed to prevent leakage of liquid from the mouth, the pump 58 is repeatedly actuated to force air under pressure into the second cavity 34, pressurizing the container. During this pressurization, air within the first cavity is exhausted through the relief valve 52, shown in FIG. 5, so that only liquid remains in the first cavity.

Turning to FIG. 1, the filled and pressurized container is placed in the backpack 12 of the hydration system 10 and outfitted on the athlete, with the hoses 22, 54 secured to the straps 14. Thus, the distal ends of the hoses 22, 54 supporting the valve assembly and pump are both kept within easy reach of the athlete so that the hose 22 can be brought to the athlete's mouth, and so that the pump 58 can be easily actuated with little extraneous movement required. If additional pressurization is required, the pump is actuated to force additional air into the second cavity of the bag. In order to relieve excess pressure, the athlete simply actuates the relief valve 66, shown in FIG. 3, on the pump mechanism to release air from the second cavity.

Although the preferred embodiment has been described with reference to a pressurized liquid dispenser, it is noted that the construction of the dispenser could also be adapted for use as a gravity feed device by constructing the container with a single interior cavity accessible through the mouth. As such, the pump mechanism may or may not be used. The arrangement of the mouth, thumb and finger holes, and the handle remain unchanged in this alternate embodiment, and the closure assembly operates in the same manner.

From the foregoing, it will be seen that this invention is one well adapted to attain the ends and objects hereinabove set forth together with other advantages which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense. As such, equivalents may be employed and substitutions made herein which fall within the reach of the invention.

What is claimed is:

1. A liquid dispenser comprising:

a container formed of flexible synthetic resin material and presenting upper and lower ends, an interior liquid-receiving cavity, a handle by which the container can be supported while the cavity is filled with liquid, and a mouth located above the cavity adjacent the upper end of the container, the mouth being movable between an open position presenting a fill opening in fluid communication with the cavity, and a closed position;

an outlet port formed in the container in fluid communication with the cavity for dispensing liquid from the cavity;

a flexible hose connected to the outlet port, the hose including a remote outlet end;

a valve positioned in the outlet end of the hose, the valve being shiftable between a flow-blocking position in which flow of the liquid is blocked and a flow-permitting position in which the liquid is dispensed; and a closure assembly positionable in a sealed position sealing the cavity shut beneath the mouth so that the cavity is substantially liquid tight, and an unsealed position exposing the cavity to the mouth for filling.

2. A liquid dispenser as recited in claim 1, wherein the container is formed of a material selected from the group consisting of vinyl and polyurethane.

3. A liquid dispenser as recited in claim 1, wherein the closure assembly includes a channel element and a rod element between which the container is pinched in the sealed position of the closure assembly, the channel element presenting an elongated channel having a first width and a coextensive opening having a width smaller than the first width, the rod element presenting an elongated body having a width larger than about the width of the opening so that the closure assembly is placed in the sealed position by positioning the container between the channel element and the rod element and forcing the body of the rod element and the material of the container past the opening into the channel along the length of the channel.

4. A liquid dispenser as recited in claim 3, wherein the channel element is constructed of a material selected from the group consisting of polystyrene, polyethylene and polypropylene.

5. A liquid dispenser as recited in claim 3, wherein the rod element is formed of a material selected from the group consisting of synthetic and natural rubber.

6. A liquid dispenser as recited in claim 1, wherein the handle is formed in the container above the mouth adjacent the upper end of the container.

7. A liquid dispenser as recited in claim 1, wherein the handle includes a pair of finger holes that are formed in the container beside the mouth.

8. A liquid dispenser as recited in claim 1, wherein two handles are provided, one of the handles being formed in the container above the mouth and the other handle including a pair of finger holes that are formed in the container beside the mouth.

9. A liquid dispenser as recited in claim 1, wherein the mouth includes an elongated slit formed in the container and a strip of support material that is secured to the container along the length of the slit, the strip of support material presenting opposed axial ends and being formed of a flexible material that is stiff relative to the container material to permit the mouth to be moved to the open position by squeezing the ends of the strip towards one another.

10. A liquid dispenser as recited in claim 9, wherein the mouth includes a pair of strips of support material secured to the container along opposite sides of the slit.

11. A liquid dispenser as recited in claim 1, wherein the container includes structure defining first and second side-by-side cavities, the first cavity being in fluid communication with the fill opening and the second cavity being isolated from the fill opening, the dispenser further comprising a pump means in fluid communication with the second cavity for pressurizing the second cavity; and a support means for supporting the container and exerting an inward pressure on the container in opposition to the outward pressure in the cavities so that the pressure in the second cavity is exerted on the liquid in the first cavity to dispense the liquid under pressure.

12. A liquid dispenser as recited in claim 11, wherein the pump means includes a hose having a first end in fluid communication with the second cavity of the container and a distal second end, and a pump for drawing air into the hose and forcing the air under pressure into the second cavity.

13. A liquid dispenser as recited in claim 12, wherein the pump includes a pair of one-way flow valves and a compressible, hollow bladder positioned in line with and between the one-way flow valves so that when the bladder is compressed, air is forced into the second cavity of the container, and when the bladder is released, air is drawn into the bladder.

14. A liquid dispenser as recited in claim 11, wherein the support means includes a back pack within which the container is sized for receipt, the back pack including shoulder straps and a means for supporting the hose and the pump means on the shoulder straps.

15. A liquid dispenser as recited in claim 11, wherein the support means includes a sleeve of material having a fixed circumferential dimension within which the container is sized for receipt.

16. A liquid dispenser as recited in claim 11, wherein the pump means includes a pump having an inlet in fluid communication with atmosphere and an outlet in fluid communication with the second cavity of the container, the pump being shiftable to draw air into the inlet and force the air under pressure into the second cavity.

17. A liquid dispenser as recited in claim 3, further comprising a tether for securing the channel element on the liquid dispenser.

18. A liquid dispenser as recited in claim 3, further comprising a tether for securing the rod element on the liquid dispenser.

* * * * *